H. W. BETWHY.
WIND SHIELD FOR HAY LOADERS.
APPLICATION FILED DEC. 21, 1908.

918,267.

Patented Apr. 13, 1909.

UNITED STATES PATENT OFFICE.

HENRY W. BETWHY, OF EMMETT, MICHIGAN.

WIND-SHIELD FOR HAY-LOADERS.

No. 918,267.   Specification of Letters Patent.   Patented April 13, 1909.

Application filed December 21, 1908. Serial No. 468,528.

*To all whom it may concern:*

Be it known that I, HENRY W. BETWHY, citizen of the United States, residing at Emmett, county of St. Clair, State of Michigan, have invented a certain new and useful Improvement in Wind-Shields for Hay-Loaders, and declare the following to be a full, clear, and exact description of the same, such as will enable others skilled in the art to which it pertains to make and use the same, reference being had to the accompanying drawings, which form a part of this specification.

My invention relates to an improvement in a wind shield for hay loaders, shown in the accompanying drawings and more particularly pointed out in the following specification and claims.

The object of this invention is to provide an attachment to a hay loader which will serve to insure the delivery of the hay after leaving the loader, onto the rack avoiding the danger of the hay falling between the rack and the loader due to the wind or other causes,—the construction being such that it may be readily attached to any hay loader upon the market.

Other improvements and advantages will be hereafter explained.

Figure 1:
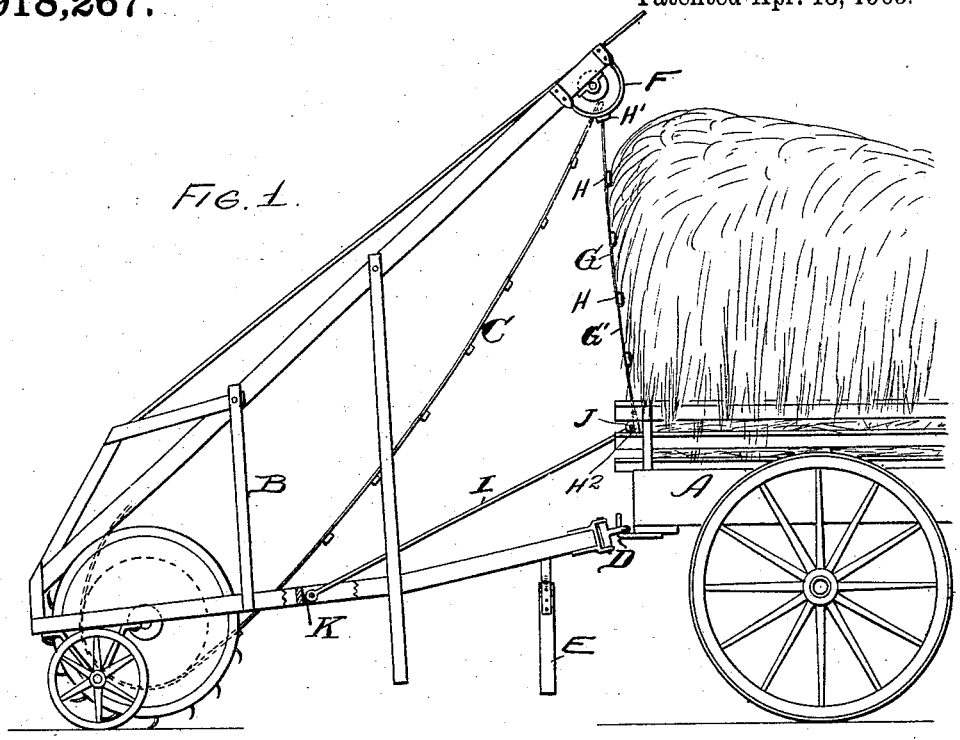
Figure 2:
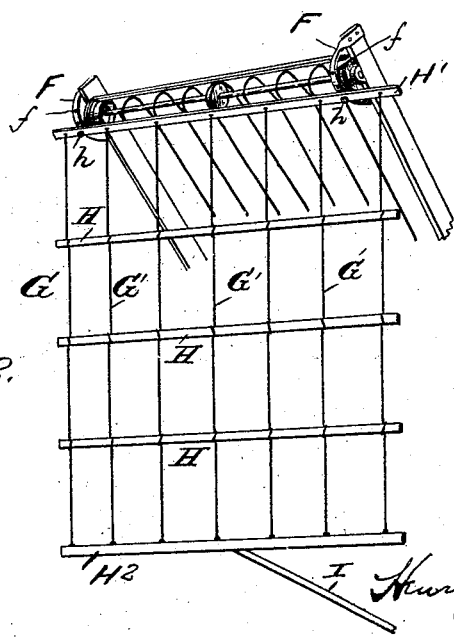
Figure 3:
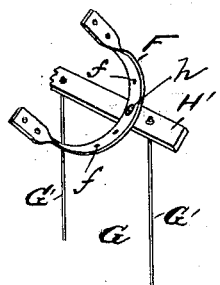

In the drawings:—Figure 1 is a side elevation of a hay loader and a portion of the hay rack, showing the loader connected with the rack and my invention attached to the hay loader and rack as it would appear when in use. Fig. 2 is a perspective view showing a portion of the hay loader with the wind shield suspended from the brackets secured to the side frame of the loader. Fig. 3 is a detail view of one of the brackets secured to the frame of the hay loader for supporting the wind shield.

Referring to the letters of reference appearing upon the drawings:—A indicates a hay rack. B the hay loader.

C is the elevator.

D is the usual flexible coupling connecting the hay loader with the hay rack.

E is a leg for supporting the forward end of the loader when disconnected from the rack.

F are semi-circular brackets secured to the side members of the hay loader frame.

G is my improved wind shield constructed of a plurality of ropes or cables G′ to which are secured cross bars H spaced a suitable distance apart.

H′ is the upper cross bar provided with apertures to receive bolts $h$ by which the bar is secured to the semi-circular brackets F. It will be seen upon referring to Figs. 2 and 3 that the brackets F are provided with a plurality of apertures $f$ in order to provide for adjusting the upper end of the wind shield with respect to the hay loader.

$H^2$ is the lowermost cross bar and is provided with a suitable clip J to receive the end of the bar I connected at its other end to the hay loader by a suitable link K,—the arrangement being such that a flexible connection is provided between the bar I, the wind shield, and the hay loader, the object being to maintain the wind shield parallel to the end of the hay rack irrespective of the position of the hay loader thereto. In other words, when the hay rack is turning a corner and drawing the hay loader, the wind shield will automatically adapt itself to this condition and insure the proper delivery of the hay upon the rack.

Having indicated the several parts by reference letters, the operation of the device will be readily understood.

Having connected the hay loader to the end of the hay rack, the wind shield is adjusted so as to convey the hay dropped from the elevator directly into the rack. Should it be necessary to adjust the top of the wind shield with respect to the discharge end of the hay loader, it may be readily accomplished by means of the several apertures provided in the side brackets. The lower part of the wind shield being free to rock on the bar I, it will remain parallel with the end of the rack irrespective of the position of the hay rack to the hay loader at the time.

Having thus described my invention, what I claim is:—

1. In a wind shield for hay loaders, a plurality of horizontal bars spaced apart, a plurality of cables connecting said bars, suitable supporting means adapted to be attached to the frame of the hay loader to receive and support the shield, and means for maintaining the lower end of the shield parallel with the end of the rack irrespective of the angle of the rack to the hay loader, substantially as described.

2. In a wind shield for hay loaders, a plurality of horizontally arranged bars spaced apart, a series of cables connecting said bars, brackets adapted to be secured to the side members of the hay loader frame, said brackets provided with a series of apertures designed to receive engaging bolts to secure the upper part of the wind shield thereto, the bolts, and means for maintaining the lower end of the wind shield parallel with the end of the hay rack irrespective of the position of the rack to the hay loader.

3. In a wind shield for hay loaders, a plurality of horizontally arranged bars spaced apart, flexible means for connecting said bars together, brackets adapted to be secured to the frame of the hay loader for supporting the upper end of the shield, means whereby the shield may be adjustably engaged to the brackets, a suitable member adapted for a flexible connection with the hay loader and lower end of the shield whereby the lower end of the shield may maintain a parallel relation with the end of the rack irrespective of the relation of the loader to the rack.

4. In a wind shield for hay loaders, a plurality of horizontally arranged bars spaced apart, flexible means connecting said bars together, brackets adapted to be secured to the frame of the hay loader for supporting the upper end of the shield, means for connecting the upper end of the shield to the brackets, and a bar adapted for a flexible connection with the frame of the loader at one end and at its other end having a flexible connection with one of the bars of the shield.

5. In a wind shield for hay loaders, a plurality of horizontally arranged bars spaced apart, a plurality of ropes connecting said bars together, semi-circular brackets adapted to be secured to the frame of the loader provided with a series of apertures designed to receive bolts for adjustable connection of the shield to the brackets, the bolts, and a bar adapted for a flexible connection at one end with the hay loader frame and at the other having a flexible connection with one of the cross bars of the shield.

In testimony whereof, I sign this specification in the presence of two witnesses.

HENRY W. BETWHY.

Witnesses:
  JAMES COGLEY,
  GEO. F. COGLEY.